(12) United States Patent
Jones et al.

(10) Patent No.: US 11,959,405 B2
(45) Date of Patent: Apr. 16, 2024

(54) VALVE SEAT INJECTOR

(71) Applicant: JAGUAR LAND ROVER LIMITED, Warwickshire (GB)

(72) Inventors: Steve Jones, Coventry (GB); Tom Matthews, Coventry (GB); Matthew McAllister, Coventry (GB); Juan Antonio San Primitivo Rodriguez, Coventry (GB); Christopher Clarke, Coventry (GB); Simon Elliott, Coventry (GB); Steven Pierson, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/004,523

(22) PCT Filed: Jul. 7, 2021

(86) PCT No.: PCT/EP2021/068908
§ 371 (c)(1),
(2) Date: Jan. 6, 2023

(87) PCT Pub. No.: WO2022/008623
PCT Pub. Date: Jan. 13, 2022

(65) Prior Publication Data
US 2023/0212963 A1    Jul. 6, 2023

(30) Foreign Application Priority Data
Jul. 9, 2020  (GB) ........................................ 2010557

(51) Int. Cl.
*F01L 3/06*    (2006.01)
*F01N 3/34*    (2006.01)

(52) U.S. Cl.
CPC .................. *F01L 3/06* (2013.01); *F01N 3/34* (2013.01); *F01L 2303/00* (2020.05); *F01N 2270/10* (2013.01); *F01N 2610/08* (2013.01)

(58) Field of Classification Search
CPC .......... F01L 3/06; F01L 2303/00; F01N 3/34; F01N 2270/10; F01N 2610/08
See application file for complete search history.

(56) References Cited

U.S. PATENT DOCUMENTS

| | | |
|---|---|---|
| 1,873,119 A | 8/1932 | Griswold |
| 3,385,053 A | 5/1968 | Honda et al. |

(Continued)

FOREIGN PATENT DOCUMENTS

| | | |
|---|---|---|
| DE | 500124 C | 6/1930 |
| DE | 3226439 A1 | 1/1984 |

(Continued)

OTHER PUBLICATIONS

International Search Report and Written Opinion of the International Searching Authority for International application No. PCT/EP2021/068908 dated Nov. 29, 2021.

(Continued)

*Primary Examiner* — Syed O Hasan
(74) *Attorney, Agent, or Firm* — Carlson, Gaskey & Olds, P.C.

(57) ABSTRACT

Aspects of the present invention relate to a valve seat (20) for a poppet valve of an internal combustion engine, wherein the poppet valve comprises a head and a stem behind the head, the valve seat comprising: an aperture (21) configured to form a seal with the head of the poppet valve when the poppet valve is in a closed position; and a peripheral body (22) defining, at least in part, one or more ports (23) shaped like e.g. grooves and sized to enable injection of liquid or (Continued)

gas from a cylinder head of the internal combustion engine into a gas stream behind the head of the poppet valve.

17 Claims, 2 Drawing Sheets

(56) References Cited

U.S. PATENT DOCUMENTS

| | | | |
|---|---|---|---|
| 4,133,175 A | 1/1979 | Katoh | |
| 2006/0037577 A1* | 2/2006 | Procknow | F02F 3/00 |
| | | | 123/193.5 |
| 2007/0163246 A1* | 7/2007 | Wassmur | F01N 3/22 |
| | | | 60/289 |
| 2020/0149497 A1* | 5/2020 | Basmaji | F02M 25/028 |

FOREIGN PATENT DOCUMENTS

| | | | |
|---|---|---|---|
| DE | 202013104782 U1 | 11/2013 | |
| FR | 2893081 A3 | 5/2007 | |
| FR | 2919020 A3 * | 1/2009 | F01L 1/46 |
| FR | 2919020 A3 | 1/2009 | |
| JP | 2005273600 A | 10/2005 | |

OTHER PUBLICATIONS

Combined Search and Examination Report under Sections 17 and 18(3) for Application No. GB2010557.3 dated Dec. 22, 2020.

\* cited by examiner

VALVE SEAT INJECTOR

TECHNICAL FIELD

The present disclosure relates to a valve seat injector for an internal combustion engine. In particular, but not exclusively it relates to injecting secondary air into an exhaust gas stream at the location of an exhaust valve seat.

BACKGROUND

Internal combustion engines comprise various fluid injectors for injecting liquid or gas into a gas stream entering or leaving a combustion chamber of the engine. Injectors used in various engines include fuel injectors, secondary air injectors, water injectors, and exhaust gas recirculation systems.

A secondary air injector is typically a probe or aperture placed in an exhaust manifold, which injects unburned ambient air into the exhaust gas stream. Atmospheric oxygen in the unburned air promotes oxidization of unburned and partially burned fuel in the exhaust, and helps to raise the exhaust temperatures for catalyst and particulate filter requirements. Secondary air may be injected at the start of a drive cycle when emissions are highest, to cause the catalyst to quickly reach its 'light-off' minimum temperature for reducing emissions. Some designs inject the air via a probe or aperture in the exhaust manifold, upstream of the catalyst.

SUMMARY OF THE INVENTION

It is an aim of the present invention to improve fluid injector technology.

Aspects and embodiments of the invention provide a valve seat, a cylinder head, an internal combustion engine, a secondary air injection system, and a system as claimed in the appended claims.

According to an aspect of the invention there is provided a valve seat for a poppet valve of an internal combustion engine, wherein the poppet valve comprises a head and a stem behind the head, the valve seat comprising: an aperture configured to form a seal with the head of the poppet valve when the poppet valve is in a closed position; and a peripheral body defining, at least in part, one or more ports shaped and sized to enable injection of liquid or gas from a cylinder head of the internal combustion engine into a gas stream behind the head of the poppet valve.

This provides the advantage of enabling improved emissions and/or efficiency. This is because the fluid can be injected very close to a poppet valve, into a high energy gas stream.

In some, but not necessarily all examples, the valve seat may be an exhaust valve seat. The one or more ports may be shaped and sized to enable injection of secondary air from the cylinder head into the gas stream. An advantage is improved emissions because secondary air can be injected as far upstream as possible, to reduce catalyst light-off times.

The peripheral body may define, at least in part, a plurality of ports. An advantage is improved emissions due to multiple injection locations which improves mixing.

The one or more ports may have a combined cross-sectional area of at least five millimetres squared.

The peripheral body may comprise one or more grooves, each groove creating at least part of one of the one or more ports when the valve seat is fitted to the cylinder head. An advantage is that minimal modifications are required to the cylinder head.

The valve seat may be sintered. An advantage is that the grooves can be formed with high precision.

At least one of the ports may comprise at least one side wall forming a reflex angle from the range 180 to 270 degrees relative to an upper surface of the body. An advantage is ease of manufacture.

At least one of the ports may shaped to provide a venturi effect to increase velocity of the gas or liquid injected into the aperture. An advantage is improved emissions due to improved mixing caused by greater injection velocity.

A portion of an exterior surface of the body of the valve seat facing away from the aperture may be stepped radially inwardly, to provide space for at least part of a manifold for distributing the liquid or gas to different port locations around the valve seat. An advantage is that minimal modifications are required to the cylinder head.

According to an aspect of the invention there is provided a cylinder head for an internal combustion engine, the cylinder head comprising: a valve seat receiving portion configured to receive the valve seat; and a gallery configured to inject liquid or gas to the valve seat receiving portion. The cylinder head may comprise a manifold configured to distribute the liquid or gas to different port locations around the valve seat receiving portion.

According to an aspect of the invention there is provided an internal combustion engine comprising the valve seat and the cylinder head.

According to an aspect of the invention there is provided a secondary air injection system for an internal combustion engine, the secondary air injection system comprising: secondary air obtaining means; the valve seat, wherein the valve seat is an exhaust valve seat; and the cylinder head, wherein the cylinder head is configured to transport the secondary air between the secondary air obtaining means and the valve seat.

The secondary air obtaining means may comprise a secondary air pump configured to pressurize the secondary air. The secondary air pump may be configured to provide a secondary air mass flow rate of at least two kilograms per hour per valve seat (per ported valve seat). An advantage is that emissions are reduced, because the secondary air is injected with high momentum to improve mixing.

The secondary air injection system may comprise an additional secondary air injector for locating downstream of the valve seat, the valve seat being a first secondary air injector. An advantage is improved emissions by enabling fine control of secondary air injection. For example, the two injectors could be operated at different times.

According to an aspect of the invention there is provided a system comprising a cylinder head for an internal combustion engine, and a valve seat for a poppet valve of the internal combustion engine, wherein the poppet valve comprises a head and a stem behind the head, wherein: the valve seat comprises an aperture configured to form a seal with the head of the poppet valve when the poppet valve is in a closed position; and wherein an interface between the cylinder head and the valve seat defines one or more ports shaped and sized to enable injection of liquid or gas from the cylinder head into a gas stream behind the head of the poppet valve.

Grooves may be provided in one or both of the valve seat or the cylinder head, to create the ports. The valve seat forms at least one surface of the port, even if the grooves are provided in the cylinder head.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
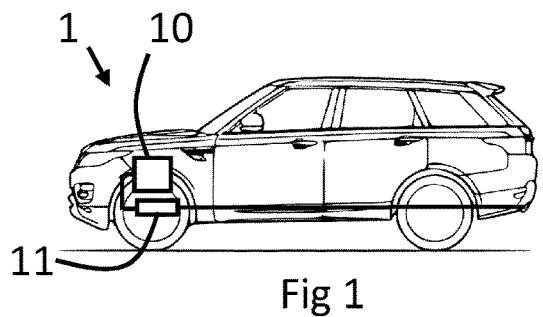
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications.

The vehicle 1 comprises an internal combustion engine 10, and may optionally comprise other torque sources (not shown). The vehicle 1 may comprise an exhaust gas aftertreatment system 11. The exhaust gas aftertreatment system 11 may comprise a catalytic converter and/or a particulate filter.

Figure 2:
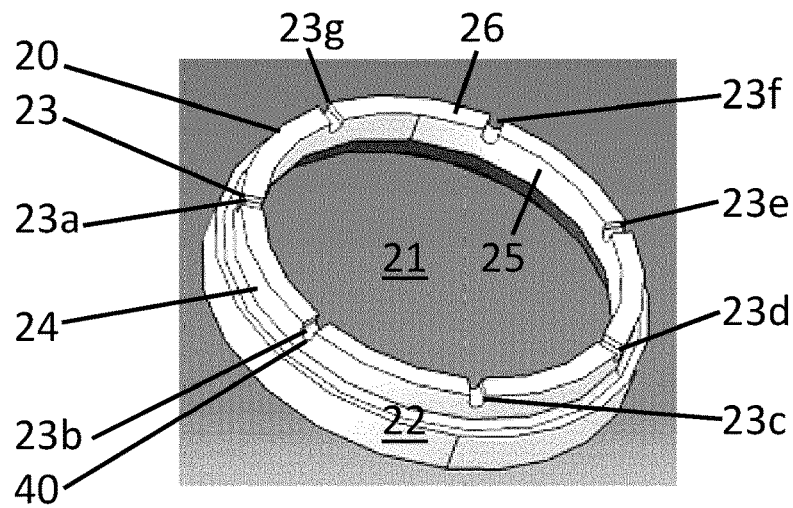
FIG. 2 illustrates an example of a valve seat.
Figure 3:
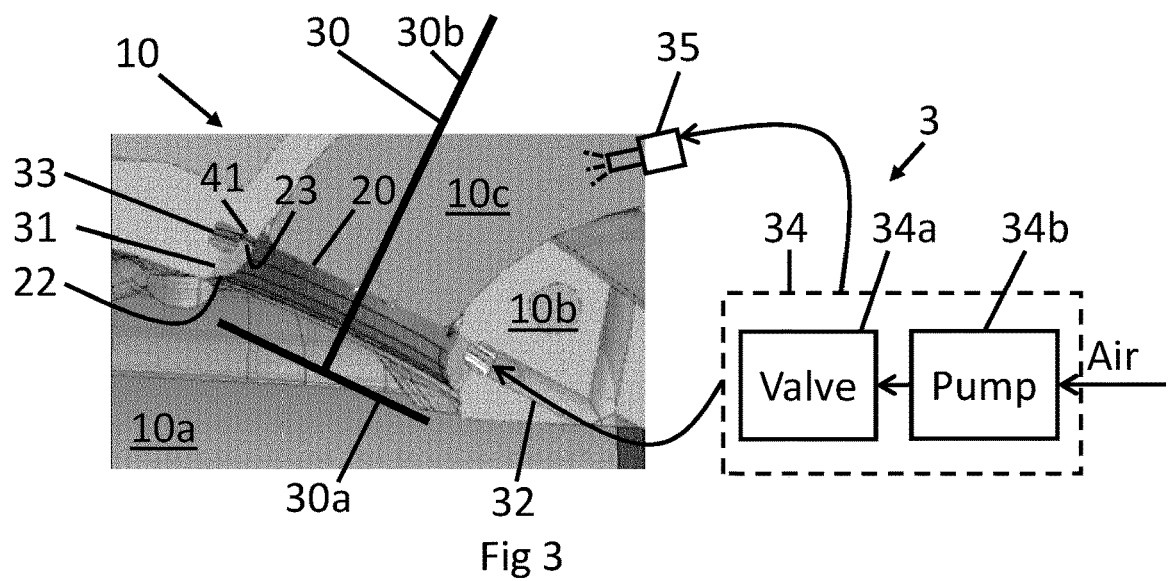
FIG. 3 illustrates an example of an internal combustion engine and a secondary air injection system.

FIG. 2 illustrates a valve seat 20 and FIG. 3 illustrates a valve seat 20 in-situ in an engine 10.

A valve seat 20 is a part of an engine 10 that mates with a head 30a of a poppet valve 30, forming a seal therebetween when the poppet valve 30 is in a closed position so that gases cannot travel past the poppet valve 30. To open the poppet valve 30, a valve actuator (not shown) lifts the poppet valve 30 away from the valve seat 20.

The valve seat 20 comprises a body 22, wherein the body 22 of the valve seat 20 comprises an aperture 21. In use, a stem 30b of the poppet valve 30 extends through the aperture 21. Exhaust gas flows from a combustion chamber 10a to an exhaust port 10c via the aperture 21. The body 22 of the valve seat 20 may be annular, defining an approximately circular aperture 21. The body 22 of the valve seat 20 extends around the periphery of the aperture 21. The body 22 of the valve seat 20 may be cylindrical.

When the poppet valve 30 is in its closed position, one face of the head 30a of the poppet valve 30 faces a combustion chamber 10a and the opposite face of the head 30a of the poppet valve 30 seals against the peripheral body 22 of the valve seat 20. The stem 30b is connected to the opposite face of the head 30a of the poppet valve 30, and extends behind the head 30a of the poppet valve 30 away from the combustion chamber 10a.

The valve seat 20 is manufactured separately from the cylinder head 10b. The valve seat 20 may be press-fitted into a depression in a cylinder head 10b. The valve seat 20 may comprise different materials and/or may be manufactured differently from the cylinder head 10b. For example, the valve seat 20 may be sintered.

In the following examples, but not necessarily all examples, the valve seat 20 is an exhaust valve seat 20 for an exhaust poppet valve 30. The valve seat 20 may be sized to fit an exhaust poppet valve 30. A head 30a of an exhaust poppet valve 30 generally has a different (usually smaller) area than the head of an intake poppet valve, which distinguishes exhaust valve seats sized for exhaust valves from intake valve seats sized for intake valves. The valve seat 20 injects gas, specifically secondary air, into the gas stream, specifically the exhaust gas stream behind the head 30a of the poppet valve 30.

The valve seat 20 defines, at least in part, one or more injection ports 23 shaped and sized to enable injection of the secondary air. A port is a small opening configured to enable injection of gas into the aperture 21. A port for injecting air is generally different from a port for injecting liquid, for example a liquid injection port may often be arranged as a group of tiny holes that atomise liquid into a spray pattern, whereas the injection ports 23 of the valve seat 20 are individual larger ports, each having an average cross-sectional area of half a square millimeter or more. The injection ports 23 enable secondary air received from a location inside the cylinder head 10b to be injected into the gas stream. The injection ports 23 are arranged around the periphery of the aperture 21 of the valve seat 20.

An injection port 23 can be created by forming at least one groove 40 at an interface 41 between the cylinder head 10b and the valve seat 20. As shown in FIG. 2, a groove 40 is a channel open at two ends.

The at least one groove 40 is open at a first surface 24 of the body 22 of the valve seat 20, to receive the gas from the cylinder head 10b. In the example of FIG. 2 the first surface 24 is an exterior surface facing away from the aperture 21. If the body 22 of the valve seat 20 is cylindrical, the first surface 24 may be regarded as an exterior cylinder wall surface. Therefore, in accordance with an aspect of the invention, the injection ports 23 are configured to inject from the wall of the exhaust port 10c.

This wall injection approach is distinct from the in-flow injection approach used by probe injectors, wherein probe injectors are inserted into the gas stream of the exhaust port 10c, to inject in a generally retrograde direction. The wall-injection approach mixes the unburned air more evenly with the exhaust gases, by injecting radially inwardly from multiple circumferentially spaced wall ports around the exhaust port 10c. This approach provides better mixing than a probe, even if the probe injector head has multiple injection ports.

The at least one groove 40 extends through the body 22 of the valve seat 20 towards the aperture 21, creating a channel for the gases. In FIG. 2 the at least one groove 40 extends at least radially inwardly towards the aperture 21. The at least one groove 40 extends in a straight or meandering path. The groove 40 is open at an upper surface 26 of the body 22 of the valve seat 20, wherein the upper surface 26 is configured to create the interface 41 with the cylinder head 10b, for example by abutting against the cylinder head 10b. If the body 22 of the valve seat 20 is cylindrical, the upper surface 26 may be regarded as an exterior cylinder end surface, the radial extent of which is defined by the thickness of the body 22 of the valve seat 20.

The at least one groove 40 is open at a second, interior surface 25 of the body 22 of the valve seat 20 facing the aperture 21, creating the injection port 23. The injection port 23 is located to inject the gas into the aperture 21 at a location downstream from the head 30a of the poppet valve 30. If the body 22 of the valve seat 20 is cylindrical, the second surface 25 may be regarded as an interior cylinder wall surface.

Figure 4A:
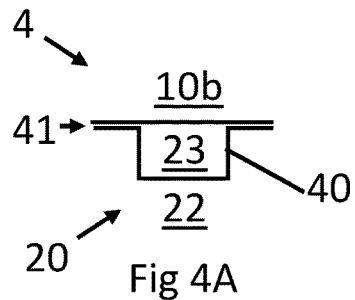
FIGS. 4A, 4B and 4C illustrate examples of a system creating an injection port.
Figure 4B:
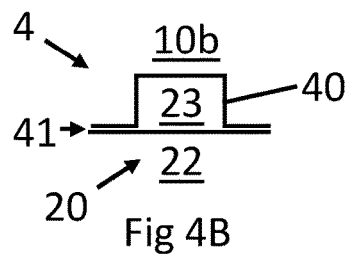
Figure 4C:
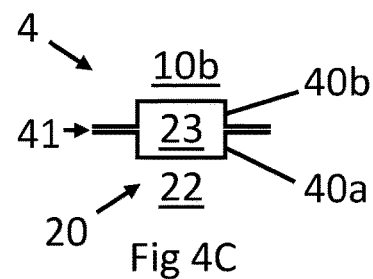

FIGS. 4A, 4B and 4C illustrate three examples of at least one groove 40 configured to define a port 23. The groove 40 is at the interface 41 between the cylinder head 10b and the valve seat 20. The interface 41 is created when the valve seat 20 is fitted to the cylinder head 10b to create a system 4.

In FIGS. 4A and 4C at least the peripheral body 22 of the valve seat 20 comprises a groove 40, the groove 40 creating at least part of the port 23. In FIG. 4A the valve seat 20 comprises a groove 40 and the cylinder head 10b does not comprise a groove 40. In FIG. 4C the valve seat 20 comprises a first groove 40a and the cylinder head 10b comprises a second groove 40b. The first groove 40a is aligned with the second groove 40b to define an injection port 23 having an area of the sum of the cross-sectional areas of the first groove 40a and the second groove 40b. In FIG. 4B the cylinder head 10b comprises a groove 40 and the valve seat 20 does not comprise a groove 40.

A groove 40 advantageously enables single-step manufacturing techniques. A die such as a sintering die may be shaped to form the grooves 40 when the valve seat 20 is formed. However, it would be appreciated that a groove 40 is not the only way to create a port 23. For example, the valve seat 20 may comprise an enclosed hole, rather than a groove 40 which is partially enclosed. However, an enclosed hole may require post-forming drilling.

Further, although FIG. 2 shows a port 23 downstream of the head 30a of the poppet valve 30, the port 23 may be further upstream and may be blocked by the head 30a of the poppet valve 30 when the valve is in its closed position. In the latter case, the port 23 is only functional when the valve is in its open position. The port 23 would still be regarded as downstream of the head 30a of the poppet valve 30, when the poppet valve 30 is in the open position.

The example of FIG. 2 shows that the body 22 of the valve seat 20 may comprise a plurality of ports 23. The ports 23 are spatially distributed around the body 22 of the valve seat 20. Seven ports 23a-23g are shown but the exact number of ports depends on the implementation. Adding more ports improves gas mixing, with diminishing improvements as the number of ports increases. Adding more smaller ports rather than fewer larger ports may also reduce stress concentration and hot spots.

The angular separation between any two ports 23 may be no more than 180 circular degrees.

FIG. 2 shows that all, or at least two or more pairs of the illustrated ports 23 may be evenly angularly spaced around the body 22 of the valve seat 20. The ports 23 do not have to be evenly spaced, but an even distribution can help with gas mixing.

FIG. 3 shows a valve seat 20 as described above, in-situ in an engine 10. FIG. 3 is a cross-section of part of the engine 10.

FIG. 3 shows a cylinder head 10b. The cylinder head 10b comprises at least one exhaust port 10c including the illustrated exhaust port 10c, and at least one intake port (not shown). FIG. 3 shows part of the exhaust port 10c. The exhaust port 10c may lead to an exhaust manifold or may be part of an exhaust manifold integrated into the cylinder head 10b. A cylinder head 10b is generally, but not in all examples, a separate component from an engine block (not shown).

The cylinder head 10b also comprises at least some of the hardware for actuating poppet valves 30. The illustrated exhaust poppet valve 30 is provided at the interface between the illustrated combustion chamber 10a and the exhaust port 10c to regulate gas from the combustion chamber 10a into the exhaust port 10c. The exhaust poppet valve 30 is shown in its open position.

The cylinder head 10b comprises a valve seat 20 which has been inserted into a valve seat receiving portion 31. For example, the valve seat receiving portion 31 may be a depression in the cylinder head 10b around the exhaust port 10c, shaped or otherwise configured to receive the valve seat 20. The valve seat receiving portion 31 may be configured to receive at least a portion of the first, exterior surface 24 of the body 22 of the valve seat 20.

In some examples, the valve seat receiving portion 31 of the cylinder head 10b may be shaped to create a thermal bridge between the valve seat 20 and the cylinder head 10b and transport heat away from the valve seat 20. For example, the valve seat receiving portion 31 may be shaped for press-fitting insertion of the valve seat 20 such that a tight fit is provided. The valve seat receiving portion 31 may comprise a thermally conducting material such as the material of the cylinder head 10b (usually metal such as aluminium).

The cylinder head 10b comprises a gallery 32 configured to inject the gas into the valve seat receiving portion 31. When the valve seat 20 is in-situ, the gallery 32 and the valve seat receiving portion 31 will provide the gas to the port or ports 23 of the valve seat 20. A gallery 32 is any passage that carries fluid from one area to another, such as a drilling in the cylinder head 10b. One or more galleries are provided per valve seat (per ported valve seat 20).

If the valve seat 20 comprises multiple spatially distributed ports 23, then the cylinder head 10b may comprise a manifold 33 as shown in FIG. 3, to distribute the gas to different port locations around the valve seat receiving portion 31. The manifold 33 is a secondary air manifold in this context. A manifold is a channel for distributing fluid from a first number of inlets, in this case at least one gallery 32, to a second, different number of outlets, in this case a plurality of ports 23.

In the example of FIG. 3, the manifold 33 is annular in shape because the body 22 of the valve seat 20 is annular. The manifold 33 at least partially circumscribes the valve seat 20, extending around at least part or all of the periphery (circumference) of the valve seat 20.

FIG. 3 also schematically illustrates a secondary air injection system 3. The example secondary air injection system 3 comprises at least the valve seat 20, the gallery 32, the manifold 33, and secondary air obtaining means 34.

The secondary air obtaining means 34 comprises the hardware for obtaining the unburned secondary air, for example from an aspiration system (not shown) or from outside the vehicle 1. The secondary air obtaining means 34 comprises various channels or conduits (not shown) for distributing the secondary air to different parts of the secondary air injection system 3.

The secondary air obtaining means 34 also comprises a secondary air pump 34b configured to pressurise the secondary air. The required pressure depends on implementation.

In some examples, the injection pressure may be controlled to provide a mass flow rate of at least two kilograms per hour per valve seat (per ported valve seat 20). In a specific example, the mass flow rate may be approximately four kilograms per hour per valve seat 20. All of the ports 23 of a valve seat 20 may provide a combined cross-sectional port area of at least five millimetres squared, and the cross-sectional area may be less than twenty millimetres squared. In a specific example, the cross-sectional area may be approximately seven millimetres squared. The secondary air pump 34b may be operated at a higher pressure than traditional systems, such as more than two bar (200 kilopascals). The injection speed of the secondary air may be more than 50 metres per second, such as approximately 100 metres per second.

The secondary air obtaining means 34 may also comprise at least one secondary air valve 34a. The secondary air valve 34a may be before or after the secondary air pump 34b. At least one secondary air valve 34a controls the flow of secondary air into the valve seat 20, and the same or a different secondary air valve 34a prevents back flow of exhaust gases into the secondary air pump 34b.

In FIG. 3, but not necessarily all examples, the secondary air injection system 3 further comprises an additional secondary air injector 35, additional to the valve seat 20. The additional secondary air injector 35 is for locating downstream of the valve seat 20. The additional secondary air injector 35 may comprise a probe or an aperture in the exhaust port 10c and/or exhaust manifold. The secondary air valve 34a or a different valve may control provision of secondary air to the additional secondary air injector 35.

The additional secondary air injector 35 may be operated at different times from the valve seat 20 secondary air injector, or at the same time. Control circuitry may be configured to control at least one of the one or more secondary air valves 34a to commence operation of the valve seat 20 as a secondary air injector, and then later commence operation of the additional secondary air injector 35 after as a secondary air injector to improve performance of the exhaust gas aftertreatment system 11. The additional secondary air injector 35 and the valve seat 20 may be operated concurrently or consecutively.

Although the above examples refer solely to injection of secondary air, in some examples additional fuel may be injected via the valve seat 20, to increase recombustion for reducing emissions.

Figure 5:
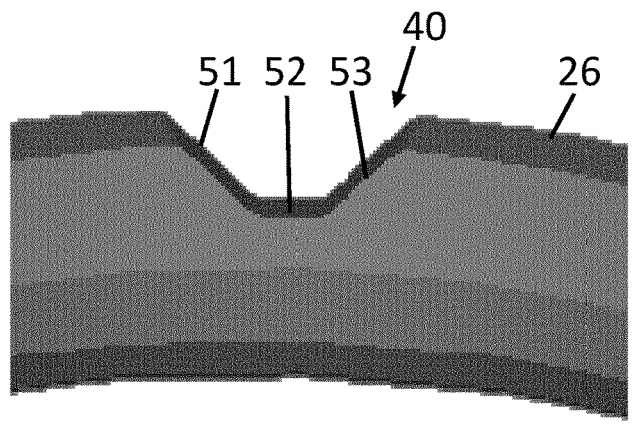
FIG. 5 illustrates an example of a cross-sectional shape for a port.

Various cross-sectional shapes of the port 23 are possible. An injection port 23 may comprise vertices or may have a continuous surface such as a cylindrical port. A port 23 with vertices may comprise at least side walls 51, 53, and optionally a base wall 52 interconnecting the side-walls, see for example FIG. 5. In FIG. 5, the groove 40 in the body 22 of the valve seat 20 comprises the walls 51, 52, 53. As shown in FIG. 5, the side walls 51, 53 may be non-parallel to each other. For example, one or both side walls 51 or 53 may form a reflex angle relative to the interface 41 (e.g. upper surface 26) of greater than 180 degrees but less than 270 degrees as shown. This angle reduces the need for post-forming machining during manufacture. The side walls 51, 53 therefore may converge towards each other with increasing depth from the interface 41. The other Figures show that other cross-sectional shapes are possible.

Figure 6:
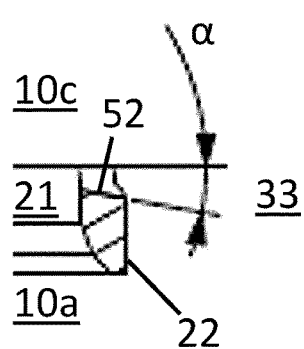
FIG. 6 illustrates an example of a port configured to provide a venturi effect.

The cross-sectional area at different points along the channel formed by an injection port 23 may be constant or variable. A variable cross-sectional area of a port 23 may be configured to provide a venturi effect to increase the velocity of injected gas to improve mixing. For example, the injection port 23 may be shaped so that its cross-sectional area where the gases enter the injection port 23 (inlet) may have a greater cross-sectional area than where the gases are injected into the aperture 21 (outlet). If at least part of the port 23 is in the valve seat 20, it would be understood that the cross-sectional area of the port 23 at the first, exterior surface 24 of the body 22 of the valve seat 20 may be greater than the cross-sectional area at the second, interior surface 26 of the valve seat 20. FIG. 6 shows an example of how to achieve this venturi effect, wherein one or more of the walls 51, 52 and/or 53, in this case comprising the base wall 52, tapers in a direction that reduces the cross-sectional area in the direction described above. The angle α of the taper relative to the interface 41/upper surface 26 may be a value from the range >0 degrees to <20 degrees, such as approximately 10 degrees.

Figure 7:
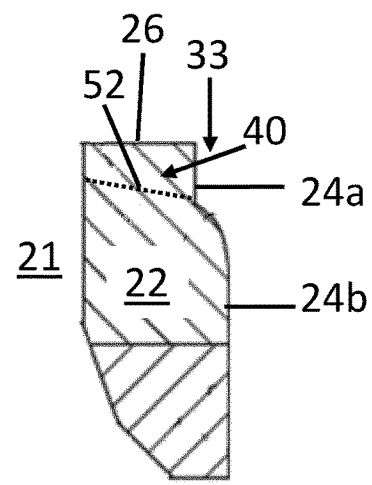
FIG. 7 illustrates an example of a valve seat step.

FIG. 7 illustrates an example of how the valve seat 20 may be configured to provide at least part of the manifold 33, to minimise or avoid the removal of material of the cylinder head 10b. The valve seat 20 may be stepped, comprising a stepped surface. In FIG. 7, the first, exterior surface 24 of the body 22 of the valve seat 20 is stepped. The exterior surface 24 comprises a first, upper portion 24a and a second, lower portion 24b, wherein the first portion 24a is stepped inwardly relative to the second portion 24b. Inwardly means radially inwardly towards the aperture 21. Upper means closer to the upper surface 26/interface 41. The stepped surface 24 creates space between the exterior surface 24 and the cylinder head 10b, the space forming at least part of the manifold 33.

In FIG. 7, the first portion 24a of the exterior surface 24 of the body 22 defines a wall of the manifold 33. The manifold 33 may be located above the second portion 24b of the exterior surface 24 of the body 22. In FIG. 7, the grooves 40 are open at the first portion 24a of the first surface 24, to receive the gases. The grooves 40 may be located above the second portion 24b of the exterior surface 24. For example, the base wall 52 of a groove 40 may be located above the second portion 24b of the exterior surface 24. At least part of the second portion 24b of the exterior surface 24 may be configured to abut the cylinder head 10b. For example, the second portion 24b may be configured to abut the valve seat receiving portion 31 of the cylinder head 10b.

It will be appreciated that various changes and modifications can be made to the present invention without departing from the scope of the present application.

Although one valve seat 20 is shown, one valve seat 20 may be provided per exhaust port 10c or per combustion chamber 10a, or per engine 10.

Although embodiments of the present invention have been described in the preceding paragraphs with reference to various examples, it should be appreciated that modifications to the examples given can be made without departing from the scope of the invention as claimed. For example, the valve seat 20 could be an intake valve seat, for injecting fluid such as a second type of fuel, water, or exhaust gases. The valve seat 20 would be an intake valve seat.

The valve would be an intake valve. The port would be an intake port. The other components of the secondary air injection system 3 may be replaced with known components of a fuel injection system, a water injection system, or a secondary fuel injection system, etc.

The present disclosure refers to the stem of the poppet valve being behind the head of the poppet valve. This would be understood as the stem being downstream of the head, wherein the stem extends through the exhaust port towards a poppet valve actuator. It would further be understood that as the stem is behind the head, the combustion chamber can be referred to as being in front of the head.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A system comprising a cylinder head for an internal combustion engine, a valve seat that is an exhaust valve seat for a poppet valve of the internal combustion engine, and a valve seat receiving portion configured to receive the valve seat, wherein the poppet valve comprises a head and a stem behind the head, the valve seat comprising: an aperture configured to form a seal with the head of the poppet valve when the poppet valve is in a closed position; and a peripheral body defining, at least in part, a plurality of ports shaped and sized to enable injection of liquid or gas from a cylinder head of the internal combustion engine into a gas stream behind the head of the poppet valve; wherein the peripheral body and/or the cylinder head comprises one or more grooves, each groove creating part of one of the plurality of ports when the valve seat is fitted to the cylinder head, and the cylinder head creating another part of said one of the plurality of ports;
a manifold configured to distribute the liquid or gas to different port locations around the valve seat receiving portion; and wherein at least one of the plurality of ports is shaped so that its cross-sectional area where gases enter the at least one of the plurality of ports is greater than where the gases are injected into the aperture to provide a venturi effect to increase velocity of the gas or liquid injected into the aperture.

2. The system of claim 1, wherein the at least one port is shaped and sized to enable injection of secondary air from the cylinder head into the gas stream.

3. The system of claim 1, wherein the at least one port has a cross-sectional area of at least five square millimeters.

4. The system of claim 1, wherein the peripheral body comprises one or more grooves, each groove creating at least part of the at least one port when the valve seat is fitted to the cylinder head.

5. The system of claim 1, wherein the valve seat is sintered.

6. The system of claim 1, wherein the at least one port comprises at least one side wall forming a reflex angle in a range from 180 to 270 degrees relative to an upper surface of the body.

7. The system of claim 1, wherein the plurality of ports is shaped to provide a venturi effect to increase velocity of the gas or liquid injected into the aperture.

8. The system of claim 1, wherein a portion of an exterior surface of the body of the valve seat facing away from the aperture is stepped radially inwardly to provide space for at least part of a manifold for distributing the liquid or gas to different port locations around the valve seat.

9. An internal combustion engine comprising the system of claim 1.

10. A secondary air injection system for an internal combustion engine, the secondary air injection system comprising:
secondary air obtaining means; the system of claim 1, wherein the valve seat is an exhaust valve seat; and wherein the cylinder head is configured to transport the secondary air between the secondary air obtaining means and the valve seat.

11. The secondary air injection system of claim 10, wherein the secondary air obtaining means comprises a secondary air pump configured to pressurize the secondary air.

12. The secondary air injection system of claim 10, configured to provide a secondary air mass flow rate of at least two kilograms per hour per valve seat.

13. The secondary air injection system of claim 10, wherein the secondary air injection system comprises an additional secondary air injector for locating downstream of the valve seat, the valve seat being a first secondary air injector.

14. A secondary air injection system for an internal combustion engine, the secondary air injection system comprising:
secondary air obtaining means; a valve seat for a poppet valve of the internal combustion engine, wherein the poppet valve comprises a head and a stem behind the head, the valve seat comprising an aperture configured to form a seal with the head of the poppet valve when the poppet valve is in a closed position; and a peripheral body defining, at least in part, a plurality of ports shaped and sized to enable injection of liquid or gas from a cylinder head of the internal combustion engine into a gas stream behind the head of the poppet valve, wherein the valve seat is an exhaust valve seat, the plurality of ports shaped to provide a venturi effect to increase velocity of the gas or liquid injected into the aperture; and a cylinder head comprising: a valve seat receiving portion configured to receive the valve seat; and a gallery configured to inject liquid or gas to the valve seat receiving portion, wherein the cylinder head is configured to transport the secondary air between the secondary air obtaining means and the valve seat; wherein the secondary air obtaining means comprises a secondary air pump configured to pressurize the secondary air.

15. The valve seat of claim 14, wherein the secondary air injection system comprises an additional secondary air injector for locating downstream of the valve seat, the valve seat being a first secondary air injector.

16. A valve seat for a poppet valve of an internal combustion engine, wherein the poppet valve comprises a head and a stem behind the head, the valve seat comprising:
an aperture configured to form a seal with the head of the poppet valve when the poppet valve is in a closed position; and
a peripheral body defining, at least in part, at least one port shaped and sized to enable injection of liquid or gas from a cylinder head of the internal combustion engine into a gas stream behind the head of the poppet valve;
wherein the valve seat is an exhaust valve seat;
wherein the at least one port is shaped and sized to enable injection of secondary air from the cylinder head into the gas stream;
wherein the peripheral body defines, at least in part, a plurality of ports;

wherein a portion of an exterior surface of the body of the valve seat facing radially away from the aperture is stepped radially inwardly to provide space for at least part of a manifold for distributing the liquid or gas to different port locations around the valve seat.

17. The valve seat of claim 16, wherein the at least one port comprises at least one side wall forming a reflex angle in a range from 180 to 270 degrees relative to an upper surface of the body.

* * * * *